United States Patent [19]

Nemeth et al.

[11] 4,212,851

[45] Jul. 15, 1980

[54] REGENERATION OF SULFIDED DOLOMITE

[75] Inventors: Edward J. Nemeth, Mt. Lebanon Township, Allegheny County; Joseph E. McGreal, Penn Hills Township, Allegheny County; John L. Howell, North Huntingdon Township, Westmoreland County, all of Pa.

[73] Assignee: United States Steel Corporation, Pittsburgh, Pa.

[21] Appl. No.: 638,118

[22] Filed: Dec. 5, 1975

[51] Int. Cl.$^2$ .................. C01B 17/16; C10K 1/26; B01J 23/92; B01J 21/20
[52] U.S. Cl. .................. 423/230; 252/411 S; 252/416; 252/419; 252/420; 423/522; 423/539; 423/561 R; 423/638
[58] Field of Search .............. 252/411 S, 416, 420, 252/419; 423/232, 233, 244, 178, 563, 230; 60/39, 18 R, 39.05

[56] References Cited

U.S. PATENT DOCUMENTS

| | | | |
|---|---|---|---|
| 3,276,203 | 10/1966 | Squires | 60/39.05 |
| 3,307,350 | 3/1967 | Squires | 10/39.05 |
| 3,402,998 | 9/1968 | Squires | 423/563 |
| 3,481,834 | 12/1969 | Squires | 60/39.18 R |
| 3,870,480 | 3/1975 | Moss | 423/244 |
| 3,947,547 | 3/1976 | Groenendaal et al. | 423/244 |
| 3,969,089 | 7/1976 | Moss et al. | 423/244 |

FOREIGN PATENT DOCUMENTS 1336563  11/1973  United Kingdom ............ 423/244

OTHER PUBLICATIONS

Chemical Abstracts, vol. 75 (1971) p. 85; 142310-y, Pell et al.

Primary Examiner—P. E. Konopka
Attorney, Agent, or Firm—William L. Krayer

[57] ABSTRACT

Dolomite which has been used to remove sulfur and/or sulfur-containing compounds from gases by chemical reactions therewith is regenerated by passing through the spent dolomite an oxidizing gas selected from oxygen, $CO_2$ and $H_2O$ at temperatures between about 1500° F. and the temperature at which the dolomite becomes unreactive.

12 Claims, 1 Drawing Figure

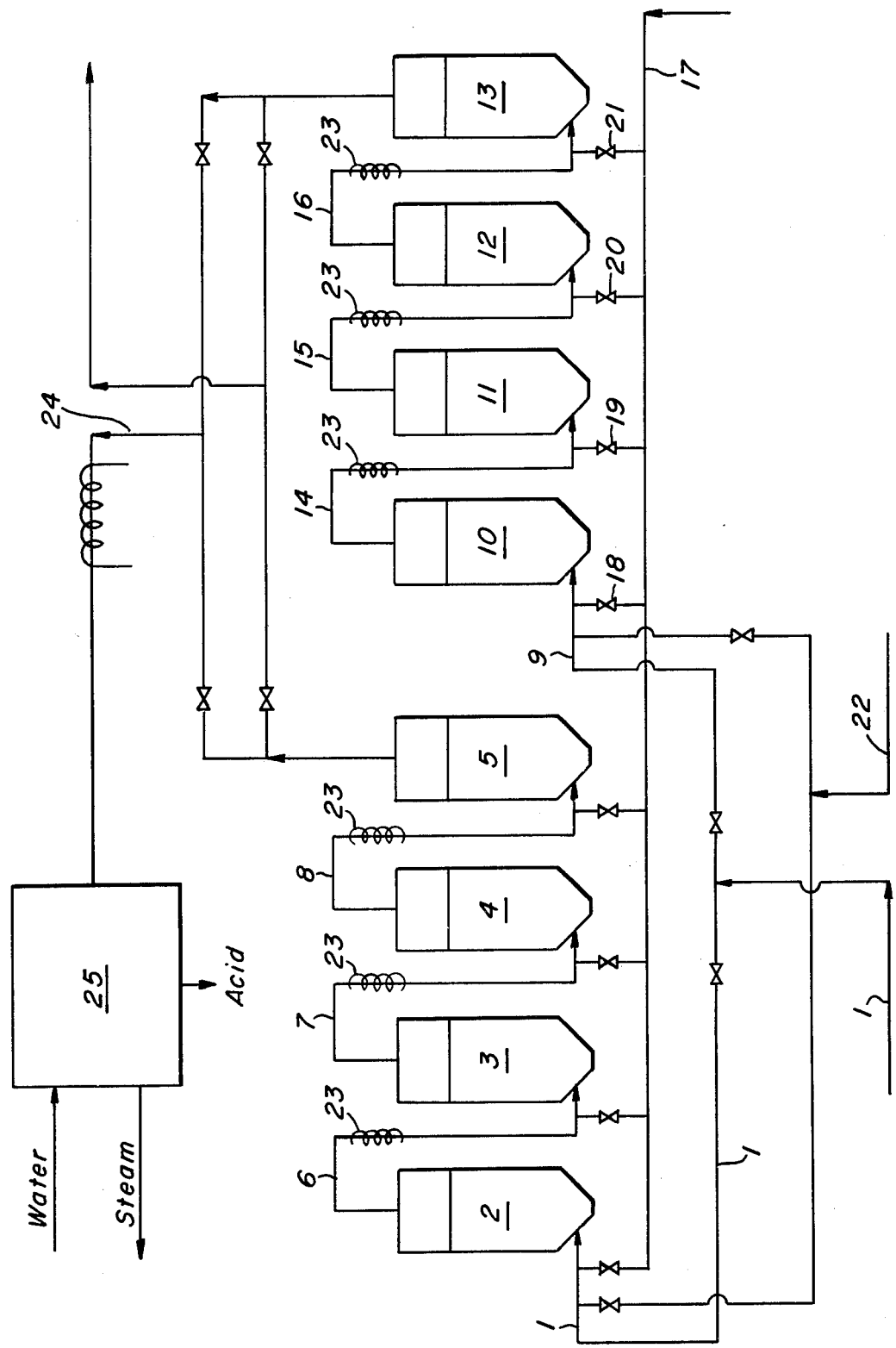

REGENERATION OF SULFIDED DOLOMITE

BACKGROUND OF THE INVENTION

Desulfurization of hot fuel gas is currently the subject of extensive research, primarily because it could lead to thermally efficient power generation in coal-based, combined-cycle systems. Hot-gas desulfurization also has advantages for coal-based direct reduction of iron ore. Most hot desulfurization processes use dolomite as the desulfurizing agent (cf. U.S. Pat. Nos. 3,276,203, 3,307,350 and 3,853,538). While dolomite is an effective gas-desulfurizing agent, the most commonly proposed method of regenerating dolomite, reacting with $CO_2$ and $H_2O$ under slightly reducing conditions at pressures greater than about 50 psig and temperatures preferably about 1000°–1200° F. to liberate $H_2S$, does not achieve complete regeneration of the dolomite. Furthermore, continuous use of dolomite for gas desulfurization followed by regeneration results in successively less efficient regeneration until, after about 10 cycles, the dolomite has only about 10 to 20 percent of its original desulfurizing capacity remaining. Furthermore, because the spent dolomite contains appreciable non-regenerated calcium sulfide, it must undergo expensive and complex treatment to bring it to a state suitable for disposal without causing pollution of the air and groundwater. When dolomite is calcined after having been regenerated by the above conventional process, some of the residual sulfur in the dolomite can be released, which requires difficult treatment to bring the stack gas to a condition suitable for venting to the atmosphere.

SUMMARY OF THE INVENTION

This invention relates to a process for regenerating dolomite or limestone which has been used to desulfurize hot fuel gas, especially fuel gas derived from the gasification of coal. Our process does not exhibit the above named disadvantages, and has several significant advantages in other respects. The dolomite is returned to a condition suitable for reuse as a hot-gas desulfurizing agent, and sulfuric acid or elemental sulfur can be recovered.

By our new process, the regenerated dolomite has nearly the same capacity for reaction with sulfur-bearing fuel gas as fresh dolomite, and repeated regeneration of the sulfided dolomite does not result in loss of capacity. Furthermore, when it is necessary to dispose of the dolomite (for example, because of an excessive accumulation of fly ash in the bed), any residual sulfur will be in the form of $CaSO_4$ and pose no air- or water-pollution problems. Our new regeneration process operates at temperatures close to temperatures commonly used to desulfurize gases such as fuel gas so that a lesser temperature swing between the gas-desulfurization step and the dolomite-regeneration step is necessary, thus avoiding delays and complexities in the sequencing of process steps. Additionally, our process may operate at atmospheric pressure which permits relatively simple vessel designs.

Although dolomite in the calcined or non-calcined state can be used for gas desulfurization, calcined dolomite is preferable because the gas desulfurization can be carried out at higher temperatures, the dolomite is more reactive, and there is little or no chance of adding $CO_2$ to reducing gases. Our new process allows the use of calcined dolomite for gas desulfurization with only one process step required to return the dolomite to a condition suitable for further hot desulfurization, whereas the conventional process requires both a regeneration and calcination step.

Completely sulfided dolomite contains about 28.5% sulfur. During desulfurization of hot sulfur-laden fuel gas, the calcium component of dolomite is converted to CaS. This reaction is most efficiently conducted in the 1400° to 1800° F. temperature range. In our regeneration process, we react the sulfided dolomite with $CO_2$ and/or $H_2O$ and/or $O_2$ at temperatures in the range of about 1500° F. to the temperature at which the dolomite becomes unreactive (preferably in the range from 1700° to 2200° F.) to achieve up to 97% regeneration, i.e. usually reducing the sulfur content to less than 3% and frequently less than 1%. By the term "the temperature at which dolomite becomes unreactive" is meant a range of thermal energy, usually over 2200° F., in which the crystalline structure of the dolomite becomes permanently altered thereby rendering a major portion of the dolomite so inaccessible to the reacting gases as to cause the extent of the sulfiding and regeneration reactions to become so slight as to cause the continued use of the dolomite to be impractical. Because of the presence of the oxidizing components and the conditions selected, the following chemical reactions can take place.

$$CaS + 4CO_2 \rightarrow CaSO_4 + 4CO \qquad (1)$$

$$CaS + 4H_2O \rightarrow CaSO_4 + 4H_2 \qquad (2)$$

$$CaS + 2O_2 \rightarrow CaSO_4 \qquad (3)$$

However, the unoxidized CaS also present can react with the $CaSO_4$. Thus

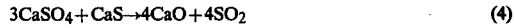

$$3CaSO_4 + CaS \rightarrow 4CaO + 4SO_2 \qquad (4)$$

Therefore, reactions (1), (2), and (4) can take place simultaneously to give the net reaction

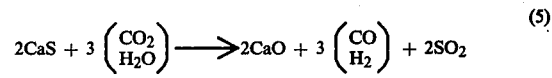

$$2CaS + 3\begin{pmatrix} CO_2 \\ H_2O \end{pmatrix} \rightarrow 2CaO + 3\begin{pmatrix} CO \\ H_2 \end{pmatrix} + 2SO_2 \qquad (5)$$

For convenience, the notation used in reactions 1–5 ignores the MgO content of dolomite since the CaO is the more active species.

The extent of reaction (5) is limited by the equilibrium ratio of product gases to reactant gases. If $O_2$ is also present in the reacting system, it will consume the CO and/or $H_2$ products and thereby favor increased yields of $SO_2$. However, it is important not to introduce $O_2$ at a concentration which will cause reaction (1), (2) or (3) to proceed so rapidly that a large fraction of CaS is converted to $CaSO_4$ rather than to CaO and $SO_2$.

We have found that about 3 percent $O_2$ in a gas stream containing 67 percent $CO_2$ and 30 percent $H_2O$, flowing through a 6-inch deep fixed bed of sulfided ⅜- by ¼-inch dolomite was able to regenerate the sulfided dolomite effectively. In our experiments, greater concentrations of $O_2$ tended to increase concentrations of $SO_2$ in the product gas, but also converted a substantial fraction of the CaS in the dolomite to $CaSO_4$. This was reversed by discontinuing $O_2$ flow until the $CaSO_4$ was consumed. It should be noted that the oxygen concentration might be varied somewhat and increased in deeper commercial-size beds or for other dolomite sizes or types. Although the same $O_2$ concentration was not always used in our experiments, the same dolomite was sulfided and regenerated at 1875° F. by our process over thirty-six successive cycles. Ninety percent regeneration was consistently obtainable.

We prefer to use a mixture of methane combustion gas, or from any other source, of a ratio of $CO_2$ to $H_2O$ of from about 5:1 to 1:5, with about 0.5 to 7% $O_2$.

Table I shows the effect of increasing the inlet oxygen concentration on the $SO_2$ concentration in the product gas.

TABLE I
EFFECT OF INCREASED $O_2$ CONCENTRATIONS ON THE $SO_2$ CONCENTRATION IN THE PRODUCT GAS

| Oxygen Concentration in Regeneration Gas, % | $SO_2$ Concentration in Product Gas, % |
|---|---|
| 0 | 0.85 |
| 2.0 | 1.48 |
| 2.8 | 1.68 |
| 3.3 | 1.80 |
| 3.9 | 1.87 |
| 4.4 | 2.40 |

$H_2O/CO_2$ 0.45 6-inch deep dolomite bed $\times$ 1.75" I.D. 1875° F. $-\frac{3}{8}" \times \frac{1}{4}"$ dolomite 0.61 scfm flow rate Various compositions of the gas, i.e., 100 percent $CO_2$, or 100 percent $H_2O$, or up to 20 percent $O_2$, or any combination of the aforementioned oxidizing gases may be used at temperatures of between about 1500° F. to the temperature at which the dolomite become unreactive (usually over 2200° F.) to accomplish the regeneration. To maximize the concentration of $SO_2$ in the gas, the process is preferably conducted at atmospheric pressure, but higher pressures may also be used to regenerate the dolomite. Data showing representative results of use of various combinations of oxidants are shown in Table II.

TABLE II
EFFECT OF VARYING GAS COMPOSITONS

| Inlet Gas Composition, % | | | | $H_2O/$ | Flow Rate | Bed Depth | Bed Diameter | $SO_2$ In Product |
|---|---|---|---|---|---|---|---|---|
| $CO_2$ | $H_2O$ | $N_2$ | $O_2$ | $CO_2$ | scfm | inches | inches | Gas, % |
| 100.0 | — | — | — | 0 | 0.61 | 6 | 1.75 | 0.8 |
| 100.0 | — | — | — | 0 | 0.80 | 12 | 2.0 | 1.5 |
| 100.0 | — | — | — | 0 | 0.80 | 12 | 2.0 | 1.4 |
| 98.0 | — | — | 2.0 | 0 | 0.61 | 6 | 1.75 | 1.3 |
| 67.6 | 30.4 | — | 2.0 | 0.45 | 0.61 | 6 | 1.75 | 1.5 |
| 52.4 | 47.6 | — | — | 0.91 | 0.61 | 6 | 1.75 | 0.6 |
| 51.4 | 46.6 | — | 2.0 | 0.91 | 0.61 | 6 | 1.75 | 1.4 |
| 21.0 | 9.8 | 67.2 | 2.0 | 0.47 | 0.61 | 6 | 1.75 | 1.0 |
| 13.3 | 42.1 | 42.6 | 2.0 | 3.2 | 0.61 | 6 | 1.75 | 1.2 |
| 8.6 | 17.2 | 72.2 | 2.0 | 2.0 | 0.61 | 6 | 1.75 | 0.9 |
| — | — | 80 | 20 | — | 0.77 | 8 | 1.75 | 7.2 to 8.2 |
| — | 52.9 | 46.6 | 0.5 | ∞ | 0.85 | 6 | 1.75 | 0.4 |

The minimum practical concentration of $SO_2$ in the product gas for a sulfuric acid plant may be considered about 3.5%. To enrich the $SO_2$ concentration of the product gas, several stages of the process may be conducted, with $O_2$ addition to the gases between stages. The $O_2$ consumes product CO and $H_2$ and allows reaction (5) to proceed in the succeeding bed. Preferably, cooling is also accomplished between the stages to control the process temperature. The data of Table III show that, even for the shallow beds used in bench-scale experiments, further reaction of gases rich in $SO_2$ is possible by adding additional $O_2$ to the reaction gases.

Table III
STAGING OF BEDS

| $SO_2$ In (%) | $SO_2$ Out (%) | Inlet Gas Composition | | | Bed Depth inches | Gas Flow (scfm) |
|---|---|---|---|---|---|---|
| | | $CO_2$ (%) | $H_2O$ (%) | $O_2$ (%) | | |
| 2.0 | 3.1 | 64.2 | 30.7 | 3.1 | 12 | 0.8 |
| 2.0 | 3.2 | 63.7 | 30.8 | 3.5 | 12 | 0.8 |
| 2.0 | 3.0 | 64.3 | 31.1 | 2.6 | 12 | 0.8 |
| 3.2 | 4.0 | 63.6 | 30.6 | 2.6 | 12 | 0.8 |
| 5.0 | 5.7 | 62.3 | 30.1 | 2.6 | 12 | 0.8 |
| 7.0 | 7.8 | 61.1 | 29.3 | 2.6 | 12 | 0.8 |
| 0 | 1.5 | 64.2 | 33.2 | 2.6 | 12 | 0.8 |
| 0 | 1.5 | 67.5 | 30.5 | 2.0 | 6 | 0.61 |
| 1.8 | 3.5 | 66.4 | 29.8 | 2.0 | 6 | 0.61 |
| 3.4 | 4.4 | 65.3 | 29.3 | 2.0 | 6 | 0.61 |

A more or less diagrammatic description of the process equipment is illustrated in FIG. 1. A 1000-tpd coal gasifier (not shown) makes 61.5 million scfd of a fuel gas which has a heating value of about 260 btu/scf (low heating value) and contains 1.16 percent $H_2S$. From this fuel gas, 59.5 million scfd passes through line 1 to a series of fixed bed vessels 2, 3, 4 and 5 each containing 32.8 tons of calcined dolomite connected by lines 6, 7 and 8, where the gas is desulfurized and the dolomite sulfided at 1600° F. The remainder of the fuel gas, 2 million scfd, passes in line 9 to another series of identical fixed bed vessels 10, 11, 12 and 13, connected by lines 14, 15 and 16, which vessels are used to regenerate dolomite sulfided in a previous cycle. Each of the vessels 2, 3, 4, 5, 10, 11, 12 and 13 is on-stream in the configuration shown for 24 hours before the two gas streams are switched. The fuel gas entering the vessel 10 containing the sulfided dolomite is burned with excess (756 scfm) $O_2$ shown entering vessel 10 through lines 17 and 18 to convert the gases to $CO_2$ and $H_2O$ and allow about 3 percent $O_2$ to remain in the gases. Oxygen is also added, i.e. used to burn the product $H_2$ and CO and to maintain a 3% level of oxygen, to the gas entering each downstream vessel 11, 12 and 13 through, respectively, lines 19, 20 and 21. Although combusted fuel gas is used to regenerate the dolomite in this illustration, any source of $CO_2$, $H_2O$, or $O_2$ can be used. Sufficient water (16.1 gpm) is added through line 22 to control the gas temperature at 1900° F. The oxidizing gas passes through the bed 10 where it converts the CaS to CaO and the gas exiting bed 10 contains about 2.88percent $SO_2$. Oxygen is added at a rate of 167 scfm through line 19 to consume the CO and $H_2$ produced and to allow the gas entering bed 11 to contain about 3 percent $O_2$. Cooling coils (23) may be provided to remove 61.2 million btu/day to control the gas temperature at 1900° F. for admission to the second stage. Oxygen is also added in lines 20 and 21. Although four stages are shown, any number of stages can be used and the $SO_2$-containing gas withdrawn at any convenient concentration. After four stages, the regeneration gas in line 24 containing about 10.3 percent $SO_2$ is cooled and sent to a sulfuric-acid plant 25. Typically the gas will also contain 70.4% $H_2O$, 17.8% $CO_2$, 1.2% $H_2$, and 0.3% CO.

Alternatively, sufficient hydrogen or natural gas could be bled into the product gas in line 24 to allow the conversion of some of the $SO_2$ to $H_2S$ and then to elemental sulfur, or hydrogen could be used in a sulfur-recovery plant to convert two-thirds of the sulfur collected to $H_2S$ which would be mixed with the regeneration gas to provide ideal feed for sulfur recovery. Hydrogen, carbon monoxide, or other reducing gas could be introduced into line 16 or other downstream stages where CaS is known or suspected to be present. The CaS will act as a catalyst for the reduction of $SO_2$ present in the gas. Generally, hydrogen or carbon monoxide need not be added in amounts greater than 200 volume percent of the $SO_2$ present.

Instead of cooling coils, any suitable cooling apparatus may be used, including the injection of water into the beds to be cooled.

When disposal of some of the dolomite is necessary, the oxidation of the CaS may be allowed to continue until $SO_2$ evolution ceases, after which the dolomite presents no air- or water-pollution problems since it contains only CaO, MgO, and the highly insoluble and unreactive $CaSO_4$.

Other variations in our invention including the following:

Fluidized beds or gravitating beds can be used instead of fixed beds during both absorption and regeneration.

Only one bed might be used and a high concentration of oxygen introduced. This is especially applicable to the processing of large dolomite particles. The oxygen can be introduced at a point or points within the dolomite bed rather than between separate stages.

Air could be used rather than oxygen.

We do not intend to be restricted to the above illustrations and variations of our invention. It may be otherwise variously practiced within the scope of the following claims.

We claim:

1. Method of regenerating calcined dolomite sulfided with sulfur from a gas stream for reuse as a desulfurizing medium comprising passing through the sulfided dolomite an oxidizing gas consisting essentially of steam and $CO_2$ in a volume ratio of about 5:1 to 1:5 and about 0.5% to about 20% oxygen at a temperature in the range of about 1500° F. up to the temperature in which the crystalline structure of the dolomite becomes permanently altered thereby rendering a major portion of the dolomite inaccessible to the reacting gases.

2. A method of desulfurizing fuel gas comprising:

(a) passing said gas through a bed of calcined dolomite to remove sulfur-containing gases therefrom, thereby generating CaS in the dolomite, and (b) regenerating the calcined dolomite by the method of claim 1.

3. Method of claim 1 in which the oxidizing gas is combusted fuel gas containing from about 0.5% to 7% oxygen.

4. Method of claim 1 in which the dolomite is divided into a plurality of beds in series and a hydrogen containing gas is introduced into at least one downstream bed containing CaS to catalyze the reduction of $SO_2$ present in the gas.

5. Method of claim 1 in which the dolomite is divided into a plurality of beds in series and oxygen is introduced in at least one downstream bed at a concentration at which CaS is converted to CaO and $SO_2$ in preference to $CaSO_4$.

6. Method of claim 5 followed by converting the $SO_2$ of the product gas into sulfuric acid.

7. Method of claim 4 in which water is injected into at least one bed of dolomite to cool it.

8. Method of regenerating calcined dolomite sulfided with sulfur from a gas stream for reuse as a desulfurizing medium comprising passing an oxidizing gas consisting essentially of $CO_2$ and steam in a ratio of from about 5:1 to about 1:5 in combination with about 0.5% to about 7.0% oxygen at a temperature between about 1500° F. and the temperature in which the crystalline structure of the dolomite becomes permanently altered thereby rendering a major portion of the dolomite inaccessible to the reacting gases through a plurality of beds of the dolomite in series, injecting oxygen into at least one downstream bed to maintain the concentration of oxygen therein up to 7%, and recovering a product gas containing at least $3\frac{1}{2}\%$ $SO_2$.

9. Method of claim 8 including the additional step of converting the $SO_2$ in the product to sulfuric acid.

10. Method of claim 8 in which the oxidizing gas is passed through the plurality of beds of dolomite at a temperature in the range of 1500° to 2200° F.

11. Method of claim 8 in which a reducing gas is introduced into at least one downstream bed containing CaS to catalyze the reduction of $SO_2$ in the gas.

12. Method of claim 8 in which the gas passing through the plurality of beds is cooled prior to entering at least one of said beds.

* * * * *